United States Patent
Lau et al.

(10) Patent No.: US 9,928,103 B1
(45) Date of Patent: Mar. 27, 2018

(54) METHODS, SYSTEMS, AND COMPUTER READABLE MEDIUMS FOR MANAGING DISTRIBUTED COMPUTING SYSTEMS USING AN EVENT DRIVEN FRAMEWORK

(71) Applicant: VCE Company, LLC, Richardson, TX (US)

(72) Inventors: Gilbert Lau, Cupertino, CA (US); Dirk Nathaniel Milotz, San Jose, CA (US); Akshaya Mahapatra, San Jose, CA (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 148 days.

(21) Appl. No.: 14/986,269

(22) Filed: Dec. 31, 2015

(51) Int. Cl.
  *G06F 9/46* (2006.01)
  *G06F 9/54* (2006.01)

(52) U.S. Cl.
  CPC ............ *G06F 9/465* (2013.01); *G06F 9/542* (2013.01)

(58) Field of Classification Search
  CPC ................................................ G06F 9/465
  See application file for complete search history.

(56) References Cited

U.S. PATENT DOCUMENTS

| | | | | |
|---|---|---|---|---|
| 2002/0040409 A1* | 4/2002 | Matena | ............... | G06F 9/465 719/315 |
| 2004/0111729 A1* | 6/2004 | Moore | ............... | G06F 9/542 719/318 |
| 2006/0218532 A1* | 9/2006 | Cordella | ............... | G06F 9/542 717/124 |
| 2016/0103717 A1* | 4/2016 | Dettori | ............... | G06F 9/45558 719/318 |
| 2017/0116051 A1* | 4/2017 | Wagner | ............... | G06F 9/542 |

* cited by examiner

*Primary Examiner* — Charlie Sun
(74) *Attorney, Agent, or Firm* — Jenkins, Wilson, Taylor & Hunt, P.A.

(57) ABSTRACT

Methods, systems, and computer readable mediums for managing distributed computing systems using an event driven framework are disclosed. In some examples, a method includes receiving, at an event handler executing on a distributed computing system, events from various sources executing on the distributed computing system. The method includes consolidating, at an event consolidator executing on the distributed computing system, the events into a consolidated event. The method includes determining, at a script executor executing on the distributed computing system, that a script is configured to be executed in response to receiving the consolidated event and, in response, executing the script.

14 Claims, 4 Drawing Sheets

METHODS, SYSTEMS, AND COMPUTER READABLE MEDIUMS FOR MANAGING DISTRIBUTED COMPUTING SYSTEMS USING AN EVENT DRIVEN FRAMEWORK

TECHNICAL FIELD

This specification relates generally to managing distributed computing systems using an event driven framework.

BACKGROUND

Some methods for developing applications for distributed computing systems involve working with application programming interfaces (APIs). For example, developers can work with APIs for networking devices, virtualization software, and storage software. Each API can be different from the others, and some APIs lack features for deploying applications and otherwise managing distributed computing systems. For example, some virtualization software APIs provide a way to create a task and then check for the status of the task. For a developer to configure an application that can determine when the task is complete, the developer would typically need to configure the application to repeatedly check for the status to see if the task is complete.

SUMMARY

This specification describes methods, systems, and computer readable mediums for managing distributed computing systems using an event driven framework. In some examples, a method includes receiving, at an event handler executing on a distributed computing system, events from various sources executing on the distributed computing system. The method includes consolidating, at an event consolidator executing on the distributed computing system, the events into a consolidated event. The method includes determining, at a script executor executing on the distributed computing system, that a script is configured to be executed in response to receiving the consolidated event and, in response, executing the script.

DETAILED DESCRIPTION

A distributed computing system includes an event driven framework for managing the distributed computing system, e.g., by managing application deployment on the distributed computing system. To illustrate the event driven framework, consider an example where a developer is developing applications that auto scale in response to external events, e.g., reporting processor or memory usage. Developing those applications can be challenging without support from a framework that enables consolidation of events.

For example, a developer may wish to configure a web application to auto scale when the processor usage of a virtual machine exceeds 70%. The web application will have to process duplicate events when several virtual machines belonging to the application generate auto scale events. The event driven framework can identify that the duplicate events can all be traced to the same application and then generate a single event for the scale out, which can decrease the complexity of developing the web application.

The event driven framework enables the development of applications for distributed computing systems by configuring applications that respond to events from the infrastructure. The event driven framework can consolidate events from various sources and, depending on the relation between the events, combine the events into a consolidated event, e.g., using an object model for a distributed computing system. The event driven framework can enable the use of machine learning to identify related events, e.g., based on events occurring at a same time. Event analysis can be used to combine low level events to generate higher level events.

Figure 1:
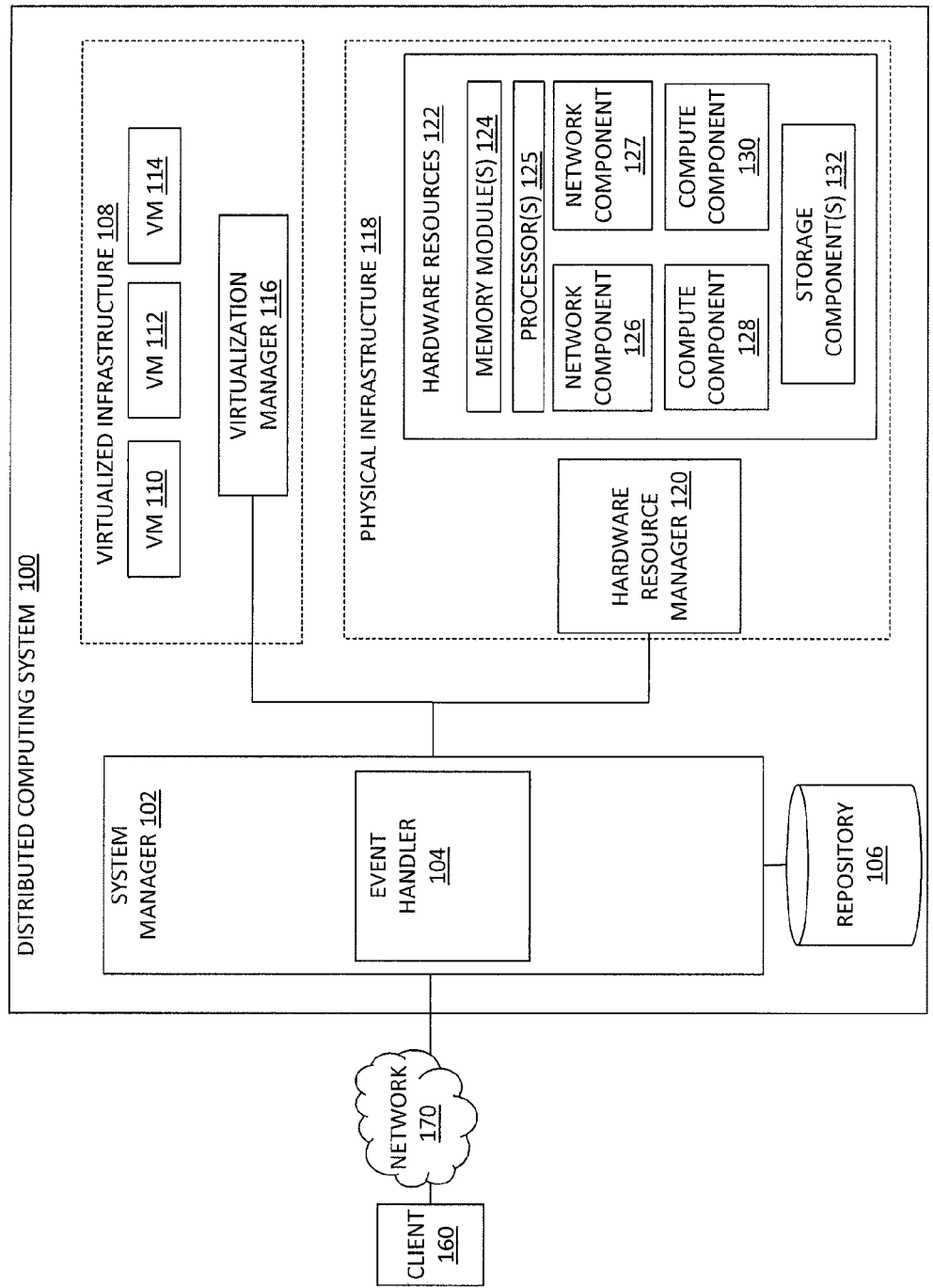
FIG. 1 is a block diagram of an example distributed computing system configured to execute applications using an event driven framework.

FIG. 1 is a block diagram of an example distributed computing system 100 configured to execute applications using an event driven framework. In some examples, the distributed computing system 100 is configured to provide data management functionality, cloud service functionality, and/or other functionality.

For example, a client 160 of the distributed computing system 100 can be an entity (e.g., software executing on a processor or a web-based interface) for allowing a user (e.g., a human operator or an automated system) to interact with the distributed computing system 100. The client 160 can communicate with the distributed computing system 100, e.g., using a data communications network 170.

The distributed computing system 100 includes a system manager 102, a repository 106, a virtualized infrastructure 108, and a physical infrastructure 118. The system manager 102 102 can be configured to manage performance, resource utilization levels, and other aspects associated with virtualized infrastructure 108 and/or physical infrastructure 118. In some examples, the system manager 102 includes or provides a graphical user interface (GUI), a command-line interface (CLI), an application programming interface (API), and/or or other communications interface. For example, the system manager 102 can provide a web-based GUI usable for establishing an event driven framework using an event handler 104.

The event handler 104 can be any appropriate entity (e.g., hardware, firmware, and/or software executing on a processor) for performing one or more aspects associated with managing distributed computing systems using an event driven framework. For example, the event handler 104 can be configured to receive events from various sources executing on the distributed computing system 100, consolidate those events into a consolidated event, and execute a script configured to be executed in response to receiving the consolidated event.

In some examples, an event history of the events received from the various sources is stored in repository 106. Repository 106 can include any data storage unit (e.g., a database or a plurality of databases) that can be configured to store event history information, e.g., event. Although FIG. 1 depicts the repository 106 as a local data storage unit residing on the distributed computing system 100, the repository 106 can also be implemented as a data storage unit located at an online location (e.g., a public distributed content site), on a local proxy server in a customer's or system administrator's environment, or on a different computing system. Further, the repository 106 can be implemented using one or more computing platforms, devices, or systems.

The virtualized infrastructure 108 can include a virtualization environment configured to simulate components of a computing device, such as a processor, system memory, and a storage device, for executing one or more virtual machines (VMs) (e.g., VM 110, VM 112, and VM 114). Each of the virtual machines can be configured to perform various functions and/or services, such as web server functions or cloud application services, and can interact with various nodes, components, and/or users.

In some examples, the virtualization manager 116 is configured to allow logical entities to be created, deleted, or modified using an API and/or a GUI. The virtualization manager 116 can be any suitable entity (e.g., software executing in a virtual machine) for managing aspects associated with the virtualized infrastructure 108. In some examples, the virtualization manager 116 is configured to provide virtual layer events to the event handler 104. Virtual layer events are events related to actions or data in the virtualized infrastructure 108.

The physical infrastructure 118 can include physical or hardware resources 122, such as memory module(s) 124, processor(s) 125, compute components 128 and 130, network components 126 and 127, and storage component(s) 132. The hardware resources 122 can be configured for use by one or more virtual entities. In some examples, the network components 126-127 (e.g., network switches or storage area network (SAN) switches) can be configured to enable communication between the components in the distributed computing system 100.

The hardware resource manager 120 can be any suitable entity (e.g., software executing in a virtual machine) for managing aspects associated with the physical infrastructure 118. In some examples, the hardware resource manager 120 can be configured to provision hardware resources 122 via one or more communications interfaces. For example, the hardware resource manager 120 can provision the hardware resources 122 for implementing one or more virtual entities in the virtualized infrastructure 108. In some examples, the hardware resource manager 120 is a management component or entity, such as a unified infrastructure manager (UIM) or a unified computing system (UCS) director entity, which is configured to provision the physical hardware of the distributed computing system 100.

The processor(s) 125 can include, e.g., a microprocessor, a central processing unit (CPU), or any other like hardware based processing unit. In some examples, some aspects of the disclosed subject matter can be stored in the memory module(s) 124, which can include random access memory (RAM), read only memory (ROM), optical read/write memory, cache memory, magnetic read/write memory, flash memory, or any other non-transitory computer readable medium. In some examples, the processor(s) 125 and memory module(s) 124 can be used to execute, implement, and/or manage the operation of some aspects of the disclosed subject matter.

In some examples, each of storage components 132-134 includes a storage medium or storage unit that is configured to store information accessible by the processor(s) 125 via a system bus. In some examples, the repository 106 or portions thereof can utilize the storage component(s) 132 and/or the memory module(s) 124. For example, the repository 106 may be implemented using the storage component(s) 132. In some examples, the repository 106 and/or the storage components 132 can include or utilize one or more storage area networks.

Figure 2:
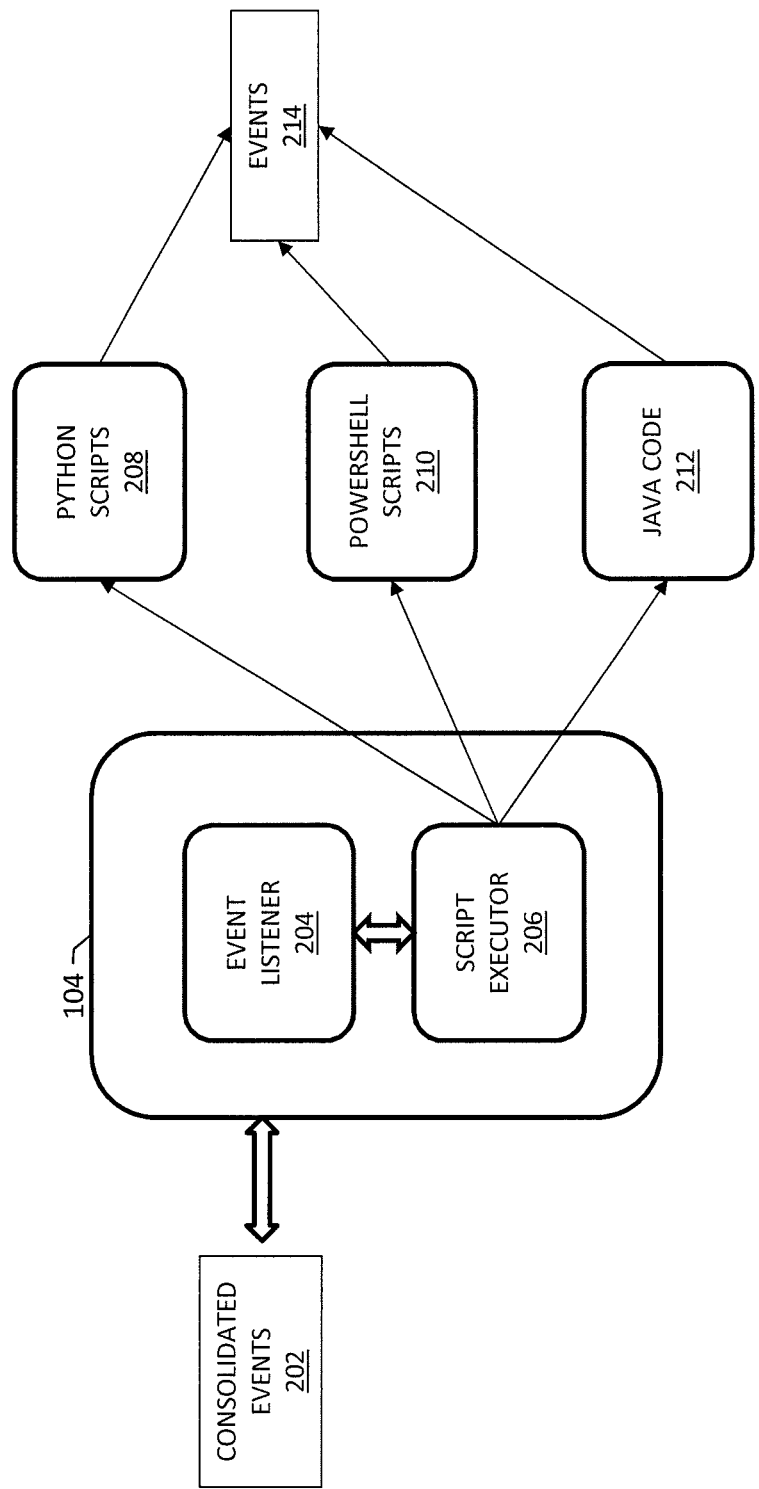
FIG. 2 is a block diagram of an example event handler.

FIG. 2 is a block diagram of an example event handler 104. The event handler 104 includes an event listener 204 and a script executor 206. The event listener 204 receives events from various sources. The script executor 206 executes scripts. Applications executing on the distributed computing system configure scripts to be executed by the script executor 206 in response to certain events.

In operation, the event handler 104 receives consolidated events 202. In response, the script executor 206 executes scripts, e.g., a respective script for each consolidated event received that matches a script supplied by an application executing on the distributed computing system. The script executor 206 can execute, for example, python scripts 208, powershell scripts 210, java code 212, or any other appropriate type of script.

The scripts, in turn, generate events 214, e.g., events that indicate that the scripts have completed or otherwise reached predetermined status points in execution. The events 214 generated by the scripts can then be consolidated, where appropriate, to create the consolidated events 202 received by the event listener 204.

Figure 3:
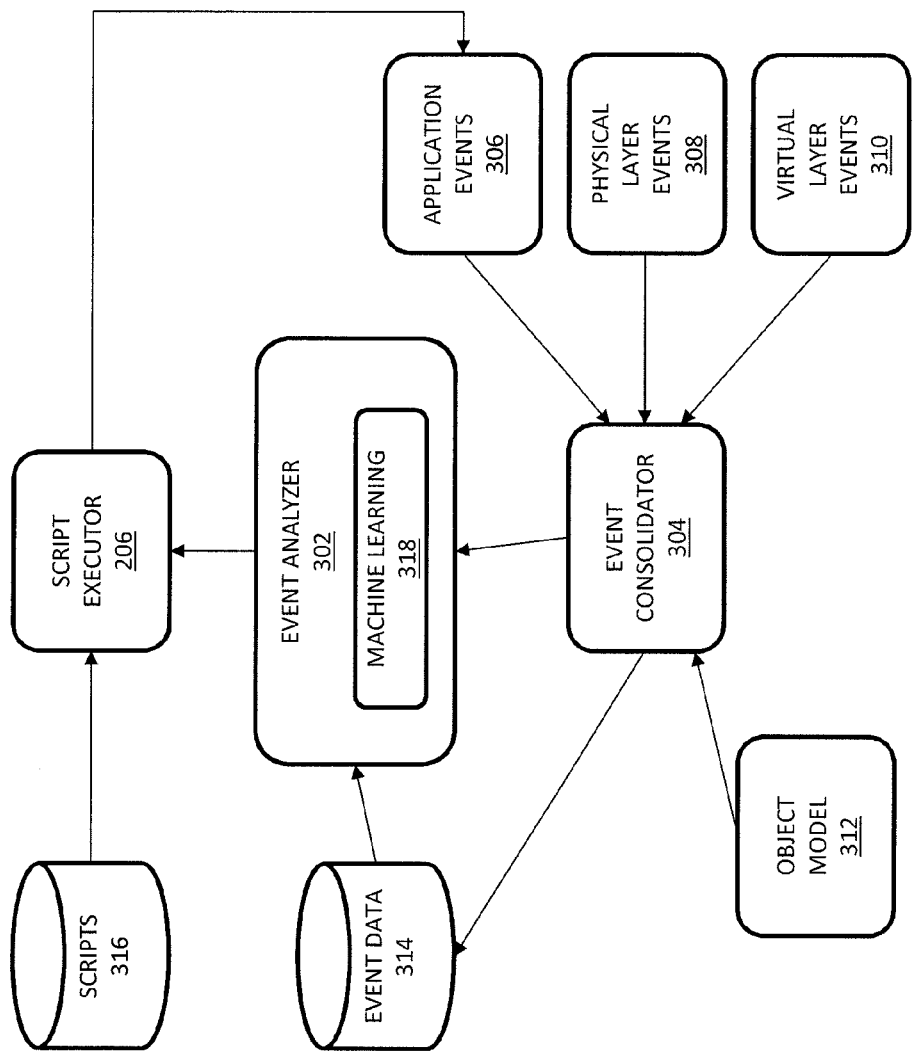
FIG. 3 is a block diagram illustrating an example flow of events for an event analyzer and event consolidator.

FIG. 3 is a block diagram illustrating an example flow of events for an event analyzer 302 and an event consolidator 304. The event consolidator 304 consolidates events from various sources into consolidated events. The events can be, for example, application events 306, physical layer events 308, and virtual layer events 310. The event consolidator 304 can use an object model 312, e.g., a model that defines a collection of objects used by a distributed computing system or one or more components of a distributed computing system.

The event consolidator 304 stores the events in an event data repository 314. For example, the event consolidator 304 can store the events in a chronological order, which can be useful, e.g., for identifying patterns of events. The event consolidator 304 can store other information with the stored events, e.g., data specifying an originating application for each event.

A physical layer event is an event that reports status information concerning physical parts of a distributed computing system, e.g., the physical infrastructure 118 of FIG. 1. The physical layer events 308 can be received, e.g., from the hardware resource manager 120 of the physical infrastructure 118 of FIG. 1.

A virtual layer event is an event that reports status information concerning virtualized components of a distributed computing system, e.g., the virtualized infrastructure 108 of FIG. 1. The virtual layer events 310 can be received, e.g., from the virtualization manager 116 of the virtualized infrastructure of FIG. 1.

The event analyzer 302 processes the event data 314 to determine when to consolidate certain sets of events into consolidated events. For example, the event analyzer 302 can determine that each event is configured to trigger a same remedial action. In another example, the event analyzer 302 can determine that each event originated in response to creation of a same software object.

Suppose that the events are scale-out events from virtual machines of a same application executing on the virtual machine. For example, the VMs 110-114 of FIG. 1 may all be supporting a same application, e.g., a software as a service (SAAS) application. If the demand on the application increases, each of VMs 110-114 may generate a scale-out event, resulting in three scale-out events that all trigger the same remedial action—the scaling out of more VMs or other resources.

Determining that each event is configured to trigger the same remedial action can include determining that each of the scale-out events was received from the same application. Consolidating the three scale-out events into a single event can prevent an inappropriate response, e.g., a scale-out operation sized for three separate applications experiencing increased demand.

Suppose that the events include a logical unit number (LUN) created event and a datastore created event. For example, the hardware resource manager 120 of FIG. 1 may create a partition of physical storage space within the storage components 132, which may result in generation of both the LUN created event and the datastore created event. Thus, two events are created in response to the creation of the same software object—the partitioning of the physical storage space.

Determining that each event originated in response to creation of the same software object can include determining that the LUN created even and the datastore created event refer to a same partition of a physical data storage system. Consolidating the two events into a single event can prevent an inappropriate response, e.g., an application determining that more space is available than has actually been partitioned.

The script executor 206 executes scripts stored in a script repository 316. The script executor 206 executes the scripts in response to consolidated events. The scripts, in turn, generate application events 306, e.g., events that indicate that the scripts have completed or otherwise reached predetermined status points in execution.

Scripts can be configured for execution in response to consolidated events in any appropriate manner. For example, the virtualization manager 116 or the hardware resource manager 120 can configure scripts to be executed by sending the scripts to the event handler 104 with data specifying which consolidated events should trigger the scripts. Applications executing on VMs 110-114 can also configure scripts to be executed, and a system administrator using the client 160 can also configure scripts to be executed.

The event analyzer 302 can use a machine learning module 318. The machine learning module 318 can be configured to use any appropriate machine learning technique to determine, using the event data 314, when multiple events should be consolidated by the event analyzer 302. For example, the machine learning module 318 can determine that events that follow a pattern, e.g., by occurring at regular intervals or happening at the same time of day, can be consolidated.

If a certain kind of event is followed by several other events reporting the same information as the certain kind of event, i.e., as in a burst of events, then the machine learning module 318 can determine to consolidate all of the events in the burst of events. Similarly, if several low level events are followed by a high level event, the machine learning module 318 can determine to consolidate the low level events into a high level event. For example, an application deployed event can cover for VM cloning, VM configuration, download code, and execute package events if all of those operations are performed on a same virtual machine. In some examples, the machine learning module 318 is trained with training data, e.g., supplied by a system administrator.

Figure 4:
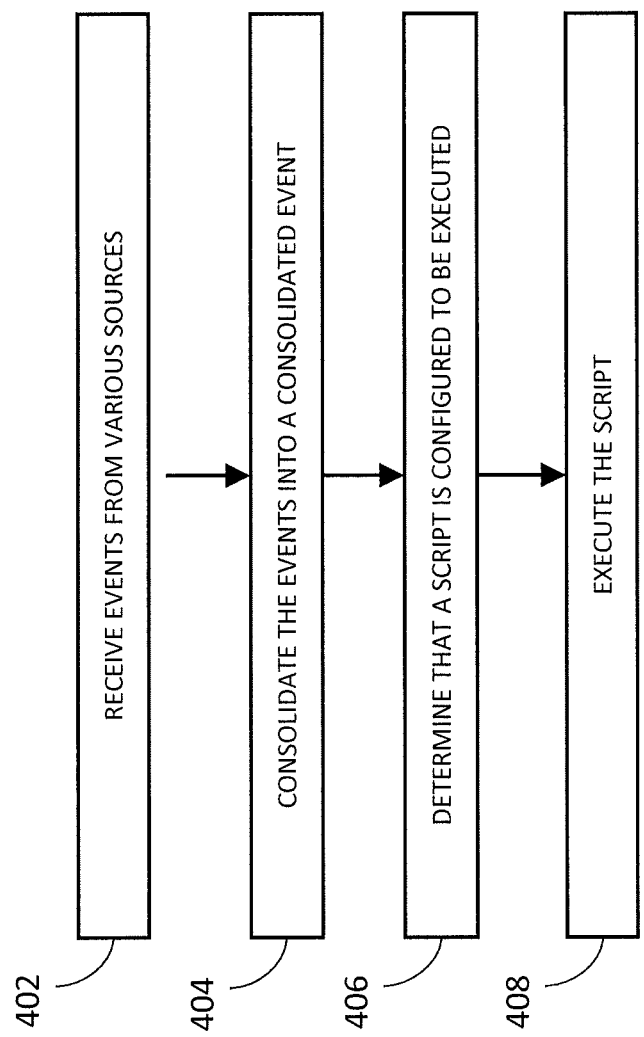
FIG. 4 is a flow diagram of an example method for managing a distributed computing system using an event driven framework.

In this manner, a complex application can be developed by following events and executing scripts based on events in a natural way. For example, an application deployment system can be developed by providing hooks for the following events:

Cloning a VM in response to an application deployment request event
Configuring a VM in response to a cloning complete event
Downloading a package in response to a configure VM complete event
Executing a package in response to a download complete event FIG. 4 is a flow diagram of an example method 400 for managing a distributed computing system using an event driven framework. The method 400 will be described with respect to a system that performs the method, e.g., the distributed computing system 100 of FIG. 1.

The system receives, at an event handler executing on the distributed computing system, events from various sources executing on the distributed computing system (block 402). The events can be, e.g., physical layer events, virtual layer events, application-generated events, and combinations of various types of events.

The system consolidates, at an event consolidator executing on the distributed computing system, the events into a consolidated event (block 404). In some examples, consolidating the events includes storing the events in a repository of events and analyzing the events using a machine learning module configured using the repository of events.

For example, consolidating events can include determining that each event is configured to trigger a same remedial action. Suppose that the events are scale-out events from virtual machines of a same application executing on the virtual machine. Determining that each event is configured to trigger the same remedial action can include determining that each of the scale-out events was received from the same application.

In another example, consolidating events can include determining that each event originated in response to creation of a same software object. Suppose that the events include a logical unit number (LUN) created event and a datastore created event. Determining that each event originated in response to creation of the same software object can include determining that the LUN created even and the datastore created event refer to a same partition of a physical data storage system.

The system determines, at a script executor executing on the distributed computing system, that a script is configured to be executed in response to receiving the consolidated event (block 406). In response, the system executes the script (block 408).

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
   receiving, at an event handler executing on a distributed computing system, a plurality of events from a plurality of sources executing on the distributed computing system;
   consolidating, at an event consolidator executing on the distributed computing system, the plurality of events into a consolidated event; and
   determining, at a script executor executing on the distributed computing system, that a script is configured to be executed in response to receiving the consolidated event and, in response, executing the script;
   wherein consolidating the plurality of events comprises determining that each event of the plurality of events is configured to trigger a same remedial action;
   wherein receiving the plurality of events comprises receiving a plurality of scale-out events from a plurality of virtual machines of a same application executing on the distributed computing system, and wherein determining that each event of the plurality of events is configured to trigger the same remedial action comprises determining that each of the scale-out events was received from the same application.

2. The method of claim 1, wherein receiving the plurality of events comprises receiving one or more physical layer events, one or more virtual layer events, and one or more application-generated events.

3. The method of claim 1, wherein consolidating the plurality of events comprises determining that each event of the plurality of events originated in response to creation of a same software object.

4. A method comprising:
   receiving, at an event handler executing on a distributed computing system, a plurality of events from a plurality of sources executing on the distributed computing system;
   consolidating, at an event consolidator executing on the distributed computing system, the plurality of events into a consolidated event; and
   determining, at a script executor executing on the distributed computing system, that a script is configured to be executed in response to receiving the consolidated event and, in response, executing the script;
   wherein consolidating the plurality of events comprises determining that each event of the plurality of events originated in response to creation of a same software object;
   wherein receiving the plurality of events comprises receiving a logical unit number (LUN) created event and a datastore created event, and wherein determining that each event of the plurality of events originated in response to creation of a same software object comprises determining that the LUN created event and the datastore created event refer to a same partition of a physical data storage system.

5. A method comprising:
   receiving, at an event handler executing on a distributed computing system, a plurality of events from a plurality of sources executing on the distributed computing system;
   consolidating, at an event consolidator executing on the distributed computing system, the plurality of events into a consolidated event; and
   determining, at a script executor executing on the distributed computing system, that a script is configured to be executed in response to receiving the consolidated event and, in response, executing the script;
   wherein consolidating the plurality of events comprises storing the plurality of events in a repository of events and analyzing the plurality of events using a machine learning module configured using the repository of events.

6. A distributed computing system comprising:
   a plurality of computers operatively connected and configured to execute software by distributing software tasks across the plurality of computers;
   an event handler, implemented on the plurality of computers, configured for receiving a plurality of events from a plurality of sources executing on the distributed computing system;
   an event consolidator, implemented on the plurality of computers, for consolidating the plurality of events into a consolidated event; and
   a script executor, implemented on the plurality of computers, for determining that a script is configured to be executed in response to receiving the consolidated event and, in response, executing the script;
   wherein consolidating the plurality of events comprises determining that each event of the plurality of events is configured to trigger a same remedial action;
   wherein receiving the plurality of events comprises receiving a plurality of scale-out events from a plurality of virtual machines of a same application executing on the distributed computing system, and wherein determining that each event of the plurality of events is configured to trigger the same remedial action comprises determining that each of the scale-out events was received from the same application.

7. The distributed computing system of claim 6, wherein receiving the plurality of events comprises receiving one or more physical layer events, one or more virtual layer events, and one or more application-generated events.

8. The distributed computing system of claim 6, wherein consolidating the plurality of events comprises determining that each event of the plurality of events originated in response to creation of a same software object.

9. The distributed computing system of claim 8, wherein receiving the plurality of events comprises receiving a logical unit number (LUN) created event and a datastore created event, and wherein determining that each event of the plurality of events originated in response to creation of a same software object comprises that the LUN created event and the datastore created event refer to a same partition of a physical data storage system.

10. The distributed computing system of claim 6, wherein consolidating the plurality of events comprises storing the plurality of events in a repository of events and analyzing the plurality of events using a machine learning module configured using the repository of events.

11. A non-transitory computer readable medium having stored thereon executable instructions which, when executed by a distributed computing system, cause the distributed computing system to perform operations comprising:
    receiving, at an event handler executing on the distributed computing system, a plurality of events from a plurality of sources executing on the distributed computing system;
    consolidating, at an event consolidator executing on the distributed computing system, the plurality of events into a consolidated event; and
    determining, at a script executor executing on the distributed computing system, that a script is configured to be executed in response to receiving the consolidated event and, in response, executing the script;

wherein consolidating the plurality of events comprises determining that each event of the plurality of events is configured to trigger a same remedial action;

wherein receiving the plurality of events comprises receiving a plurality of scale-out events from a plurality of virtual machines of a same application executing on the distributed computing system, and wherein determining that each event of the plurality of events is configured to trigger the same remedial action comprises determining that each of the scale-out events was received from the same application.

12. The computer readable medium of claim 11, wherein receiving the plurality of events comprises receiving one or more physical layer events, one or more virtual layer events, and one or more application-generated events.

13. The computer readable medium of claim 11, wherein consolidating the plurality of events comprises determining that each event of the plurality of events originated in response to creation of a same software object.

14. The computer readable medium of claim 11, wherein consolidating the plurality of events comprises storing the plurality of events in a repository of events and analyzing the plurality of events using a machine learning module configured using the repository of events.

* * * * *